United States Patent
Al-kadi et al.

(10) Patent No.: US 11,501,633 B2
(45) Date of Patent: Nov. 15, 2022

(54) SYSTEM AND METHOD FOR CONTROLLING ELECTRONIC DEVICES

(71) Applicant: NXP B.V., Eindhoven (NL)

(72) Inventors: Ghiath Al-kadi, Graz (AT); Michael Schober, Graz (AT); Derek Park, Fremont, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/141,329

(22) Filed: Jan. 5, 2021

(65) Prior Publication Data

US 2021/0209935 A1 Jul. 8, 2021

(30) Foreign Application Priority Data

Jan. 8, 2020 (EP) ..................................... 20150803

(51) Int. Cl.
*G08C 17/02* (2006.01)
*G01S 5/02* (2010.01)
*G01S 3/04* (2006.01)

(52) U.S. Cl.
CPC .............. *G08C 17/02* (2013.01); *G01S 3/043* (2013.01); *G01S 5/02585* (2020.05)

(58) Field of Classification Search
CPC ..... G08C 17/02; G08C 2201/70; G01S 3/043; G01S 5/02585
See application file for complete search history.

(56) References Cited

U.S. PATENT DOCUMENTS

| 2003/0073412 | A1* | 4/2003 | Meade, II | G08C 17/02 455/3.03 |
|---|---|---|---|---|
| 2013/0247117 | A1* | 9/2013 | Yamada | H04W 4/029 340/12.5 |
| 2015/0264506 | A1 | 9/2015 | Balabanis et al. | |
| 2016/0077604 | A1* | 3/2016 | Youssef | B60S 1/4019 345/157 |
| 2016/0358459 | A1* | 12/2016 | Singhar | H04W 4/023 |
| 2017/0199585 | A1* | 7/2017 | Grenet | G06F 3/0346 |
| 2018/0279253 | A1* | 9/2018 | Knoblauch | H04W 64/00 |
| 2018/0322774 | A1* | 11/2018 | Wang | G08C 17/02 |
| 2018/0372832 | A1 | 12/2018 | Ko et al. | |
| 2019/0027021 | A1* | 1/2019 | Ko | H04M 1/725 |
| 2019/0180609 | A1 | 6/2019 | Tchedikian | |

(Continued)

*Primary Examiner* — Joseph H Feild
*Assistant Examiner* — Rufus C Point (57) ABSTRACT

In accordance with a first aspect of the present disclosure, a control system is provided for controlling electronic devices, the control system comprising: an ultra-wideband communication unit configured to receive ultra-wideband signals from the electronic devices, and a processing unit configured to select a specific electronic device among said electronic devices for further communication, wherein the processing unit is configured to select said specific electronic device using an angle of arrival of the ultra-wideband signals received from the electronic devices. In accordance with a second aspect of the present disclosure, a corresponding control method for controlling electronic devices is conceived. In accordance with a third aspect of the present disclosure, a computer program is provided, comprising executable instructions that, when executed by a control system for controlling electronic devices, cause said control system to carry out or control a method of the kind set forth.

11 Claims, 7 Drawing Sheets

(56) References Cited

U.S. PATENT DOCUMENTS

2019/0317177 A1* 10/2019 Ertan ...................... G01S 13/75
2020/0106877 A1*  4/2020 Ledvina .................. H04L 69/18
2021/0349177 A1* 11/2021 Colafrancesco .......... G01S 3/48

* cited by examiner

SYSTEM AND METHOD FOR CONTROLLING ELECTRONIC DEVICES

CROSS-REFERENCE TO RELATED APPLICATIONS

This application claims priority under 35 U.S.C. § 119 to European Patent Application No. 20150803.3, filed on Jan. 8, 2021, the contents of which are incorporated by reference herein.

TECHNICAL FIELD

The present disclosure relates to a control system for controlling electronic devices. Furthermore, the present disclosure relates to a corresponding control method for controlling electronic devices, and to a corresponding computer program.

BACKGROUND

Electronic devices, such as televisions and radios, may be controlled by remote control units. These remote-control units may be universal in the sense that they are able to control a plurality of different electronic devices instead of being suited exclusively for controlling a single type of electronic device. However, since these remote-control units are universal, it is important to select a specific electronic device among a plurality of candidate electronic devices, before the remote-control units can be used. This selection should be performed in accordance with the intention of the user.

SUMMARY

In accordance with a first aspect of the present disclosure, a control system is provided for controlling electronic devices, the control system comprising: an ultra-wideband communication unit configured to receive ultra-wideband signals from the electronic devices, and a processing unit configured to select a specific electronic device among said electronic devices for further communication, wherein the processing unit is configured to select said specific electronic device using an angle of arrival of the ultra-wideband signals received from the electronic devices.

In one or more embodiments, the processing unit is configured to select, as said specific electronic device, the electronic device from which the ultra-wideband signal having the smallest angle of arrival is received.

In one or more embodiments, the control system further comprises an inertial measurement unit, wherein the processing unit is further configured to select said specific electronic device using said angle of arrival as well as measurement data provided by the inertial measurement unit.

In one or more embodiments, the control system is integrated into a remote-control unit.

In one or more embodiments, the further communication comprises transmitting one or more functional commands to the selected specific electronic device.

In one or more embodiments, the control system further comprises the electronic devices.

In one or more embodiments, the electronic devices comprise a plurality of ultra-wideband antennas.

In one or more embodiments, the number of ultra-wideband antennas is three.

In one or more embodiments, the electronic devices comprise a localization unit, wherein said localization unit is configured to determine a relative position of the electronic devices with regard to the ultra-wideband communication unit using the ultra-wideband antennas.

In one or more embodiments, the processing unit is further configured to determine a first vertical angle, being a vertical angle of arrival of an ultra-wideband signal transmitted by the ultra-wideband communication unit to the electronic devices, and the electronic devices are configured to determine a second vertical angle, being a vertical angle of arrival of said ultra-wideband signal as received by the electronic devices.

In one or more embodiments, the processing unit is further configured to select the specific electronic device if the first vertical angle has a predefined correlation with the second vertical angle.

In one or more embodiments, the predefined correlation is represented by the equation $\delta+90°=\varepsilon$, wherein $\delta$ represents the first vertical angle and $\varepsilon$ represents the second vertical angle.

In accordance with a second aspect of the present disclosure, a control method for controlling electronic devices is conceived, the control method comprising: receiving, by an ultra-wideband communication unit, ultra-wideband signals from the electronic devices, and selecting, by a processing unit, a specific electronic device among said electronic devices for further communication, wherein the processing unit selects said specific electronic device using an angle of arrival of the ultra-wideband signals received from the electronic devices.

In one or more embodiments, the processing unit selects, as said specific electronic device, the electronic device from which the ultra-wideband signal having the smallest angle of arrival is received.

In accordance with a third aspect of the present disclosure, a computer program is provided, comprising executable instructions that, when executed by a control system for controlling electronic devices, cause said control system to carry out or control a method of the kind set forth.

DESCRIPTION OF DRAWINGS

Embodiments will be described in more detail with reference to the appended drawings, in which.

DESCRIPTION OF EMBODIMENTS

Electronic devices, such as televisions, radios and game consoles, may be controlled by remote control units. These remote-control units may be universal in the sense that they are able to control a plurality of different electronic devices instead of being suited exclusively for controlling a single type of electronic device. However, since these remote-control units are universal, it is important to select a specific electronic device among a plurality of candidate electronic devices, before the remote-control units can be used. This selection should be performed in accordance with the intention of the user.

In particular, many consumer electronic devices require the knowledge of their associated remote-control unit or gaming pad in order to translate a user movement in a three-dimensional space into actual commands in the console or consumer electronic device. Furthermore, while universal remote-control units are widely used, they have the limitation that a targeted device—i.e., a device that the user intends to control by means of the remote-control unit—should be selected before it can be controlled. Although remote control units typically contain an inertial measurement unit (IMU), such an IMU does not provide enough information to determine the position of the remote-control units. As a result, it may be difficult to perform a correct selection of a targeted device.

Figure 1:
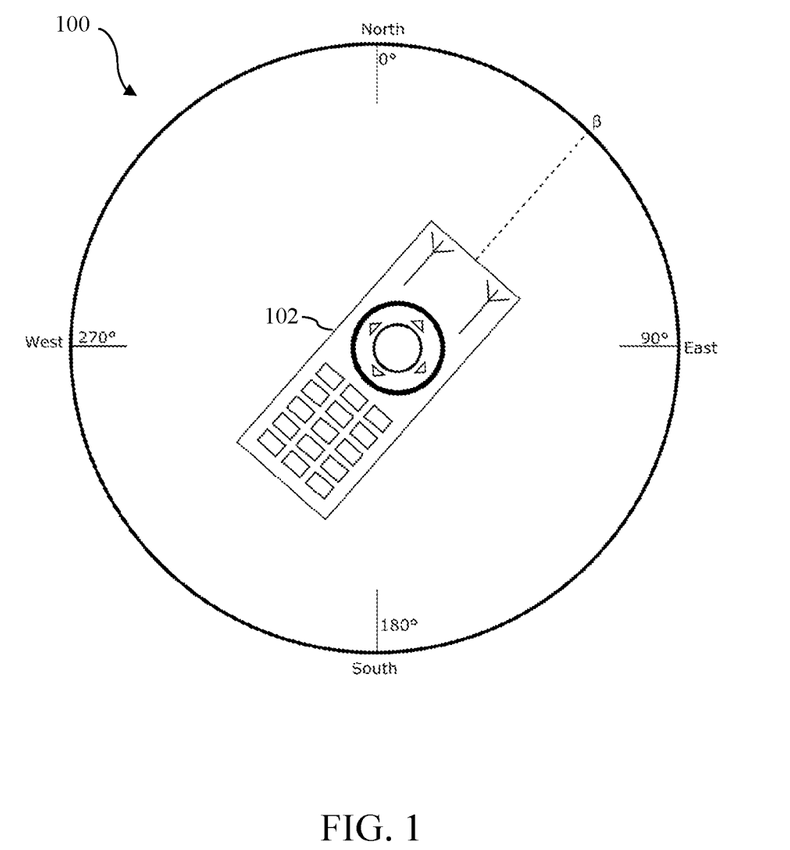
FIG. 1 shows an example of orientation sensing.

FIG. 1 shows an example of orientation sensing 100. Many remote-control units, for example for smart televisions, contain an inertial measurement unit (IMU) for offering a better user experience of controlling the targeted device. A typical IMU contains three sensors: an angular rate sensor, a magnetometer and an accelerometer. The angular rate sensor is configured to track rotatory movements. The magnetometer measures the direction of the magnetic field, which provides an absolute orientation with regard to the magnetic field of the earth. The accelerometer is used for tracking linear accelerations. FIG. 1 shows a remote-control unit 102 that contains such an IMU (not shown), which is measuring its orientation with the magnetic field as a reference. A drawback of the IMU is that it cannot be used for an accurate position determination of the remote-control unit, because of the drift of the linear acceleration sensor (i.e., the accelerometer).

Figure 2:
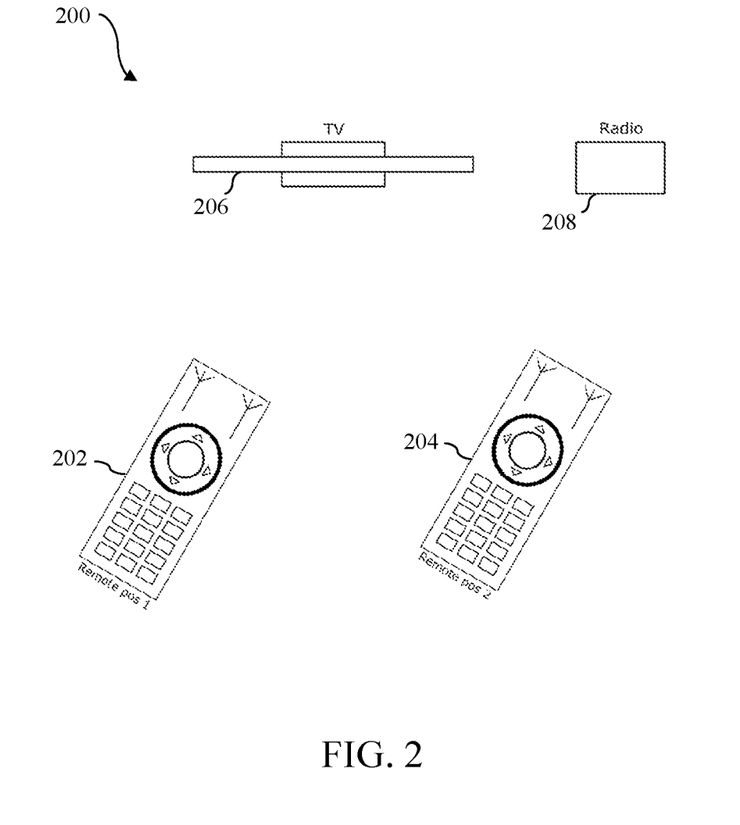
FIG. 2 shows an example of a control system.

FIG. 2 shows an example of a control system 200. The system comprises a remote-control unit which is universal in the sense that it is able to control different types of electronic devices. In the present example, the remote-control unit is able to control at least a television 206 and a radio 208. Furthermore, the remote-control unit may be held by a user at different positions 202, 204. These positions reflect the intention of the user to select a specific electronic device for further communication. For example, at the first position 202 the user intends to control the television 206, while at the second location 204 the user intends to control the radio 208. As mentioned above, it may be difficult to perform a correct selection of a targeted device, i.e. to perform a selection which is in accordance with the intention of the user.

In particular, in the system 200 a single remote-control unit may be used for controlling the television 206 and the radio 208. The device 206, 208 that is selected by the remote-control unit should be the device the remote points at. In FIG. 2, the remote-control unit at "Remote position 1" 202 points at the television 206 and the remote-control unit at "Remote position 2" 204 points at the radio 208. However, the remote-control unit has the same orientation with regard to the magnetic field in both positions 202, 204. As a result, no accurate position determination can be performed using the IMU, and as a consequence, the targeted device 206, 208 might not be selected correctly. Furthermore, a position determination based on a received signal strength indicator (RSSI) would also not give a satisfactory result, because an RSSI-based distance measurement has an accuracy of about 1.5 meters, which is not sufficient to determine the position of the remote-control unit accurately enough for enabling a correct selection of a targeted device 206, 208. Now a control system and a corresponding control method will be discussed, which facilitate a correct selection of a targeted device.

Figure 3:
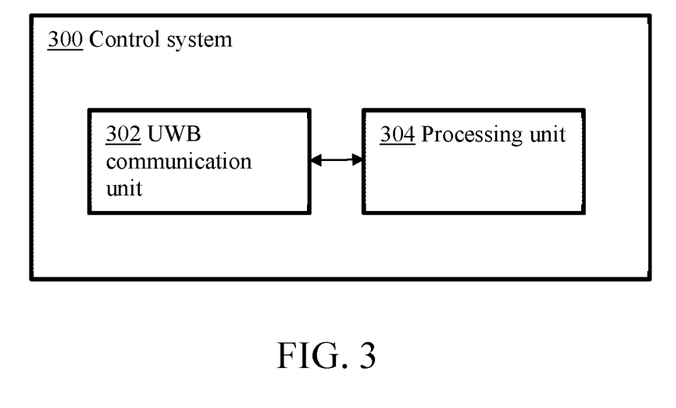
FIG. 3 shows an illustrative embodiment of a control system.

FIG. 3 shows an illustrative embodiment of a control system 300. The control system 300 comprises an ultra-wideband (UWB) communication unit 302 and a processing unit 304 which are operatively coupled to each other. The UWB communication unit 302 is configured to receive UWB signals from electronic devices (not shown). The processing unit 304 is configured to select a specific electronic device among the electronic devices for further communication. Furthermore, the processing unit 304 is configured to select the specific electronic device using an angle of arrival of the UWB signals received from the electronic devices. In this way, a correct selection of a targeted device is facilitated.

Figure 4:
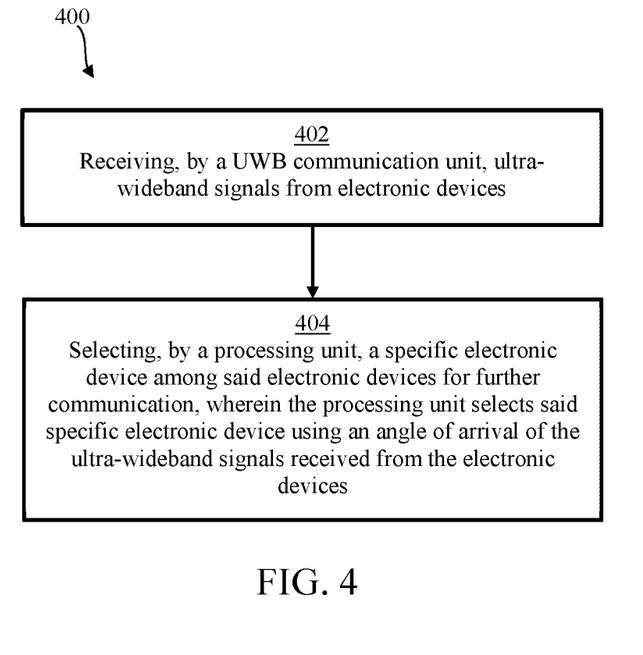
FIG. 4 shows an illustrative embodiment of a control method for controlling electronic devices.

FIG. 4 shows an illustrative embodiment of a control method 400 for controlling electronic devices. The control method 400 comprises the following steps: at 402, receiving, by a UWB communication unit, ultra-wideband signals from electronic devices, and at 404, selecting, by a processing unit, a specific electronic device among said electronic devices for further communication, wherein the processing unit selects said specific electronic device using an angle of arrival of the ultra-wideband signals received from the electronic devices. As mentioned above, in this way, a correct selection of a targeted device is facilitated.

In one or more embodiments, the processing unit is configured to select, as the specific electronic device, the electronic device from which the ultra-wideband signal having the smallest angle of arrival is received. This results in a practical and effective implementation of the selection of a targeted device. In one or more embodiments, the control system further comprises an inertial measurement unit, and the processing unit is further configured to select the specific electronic device using the angle of arrival as well as measurement data provided by the inertial measurement unit (IMU). By combining the data of the IMU with the angle of arrival measurement, the probability that a targeted device is correctly selected is further increased. The control system may be integrated in a remote-control unit, for example. In one or more embodiments, the further communication comprises transmitting one or more functional commands to the selected specific electronic device. Thus, after the selection the control system may be used to control the functionality of the selected electronic device.

Figure 5:
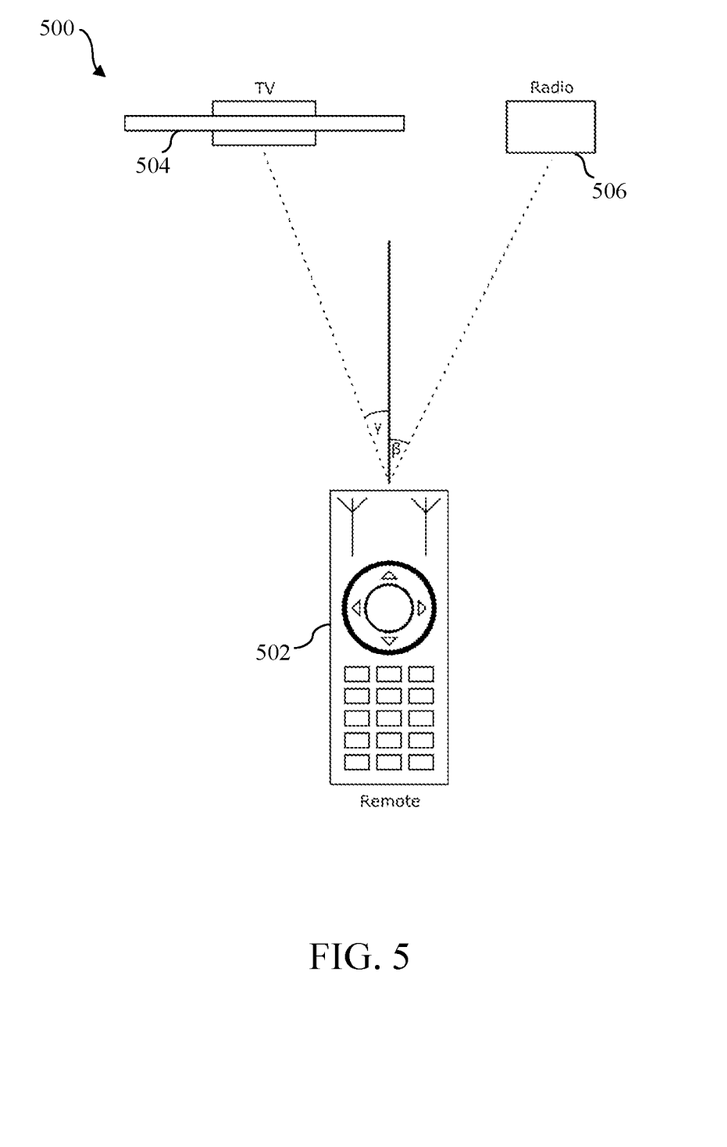
FIG. 5 shows another illustrative embodiment of a control system.

FIG. 5 shows another illustrative embodiment of a control system 500. The system 500 comprises a remote-control unit 502 which is configured to control a first electronic device 504 (a television) and a second electronic device 506 (a radio). Before either one of the electronic devices 504, 506 can be controlled, the targeted electronic device should be selected. In this embodiment, the electronic device 504, 506 is selected which has transmitted an ultra-wideband signal that is received with the smallest angle of arrival by the remote-control unit 502. Thus, if the angle γ is smaller than the angle β, then the first electronic device 504 is selected, and if the angle β is smaller than the angle γ, then the second electronic device 506 is selected.

FIG. 5 shows a remote-control unit 502 that contains a UWB interface. Using this UWB interface, the remote-control unit 502 measures the angle of arrival of the UWB signals that are emitted by the first electronic device 504 and the second electronic device 506. The signal emitted by the first electronic device 504 is received from the angle γ and the signal emitted by the second electronic device 506 is received from the angle β. Since users will usually point at a dedicated device with the remote-control unit 502, the ambiguity can be neglected because the smallest angle determines the selected device. In the scenario shown in FIG. 5, the remote-control unit 502 can be moved and the angles will change according to the movement because the angles of the received signals are measured instead of the orientation of the remote-control unit 502. This means that a two-dimensional device selection can be performed using the UWB interface. For selecting a targeted device in three-dimensional space, the measurement data of an inertial measurement unit can be combined with the UWB measurement data. In that case, the first electronic device 502 may be placed above the second electronic device 504, but have the same x- and y-coordinates, such that the angle γ is substantially equal to β.

Figure 6:
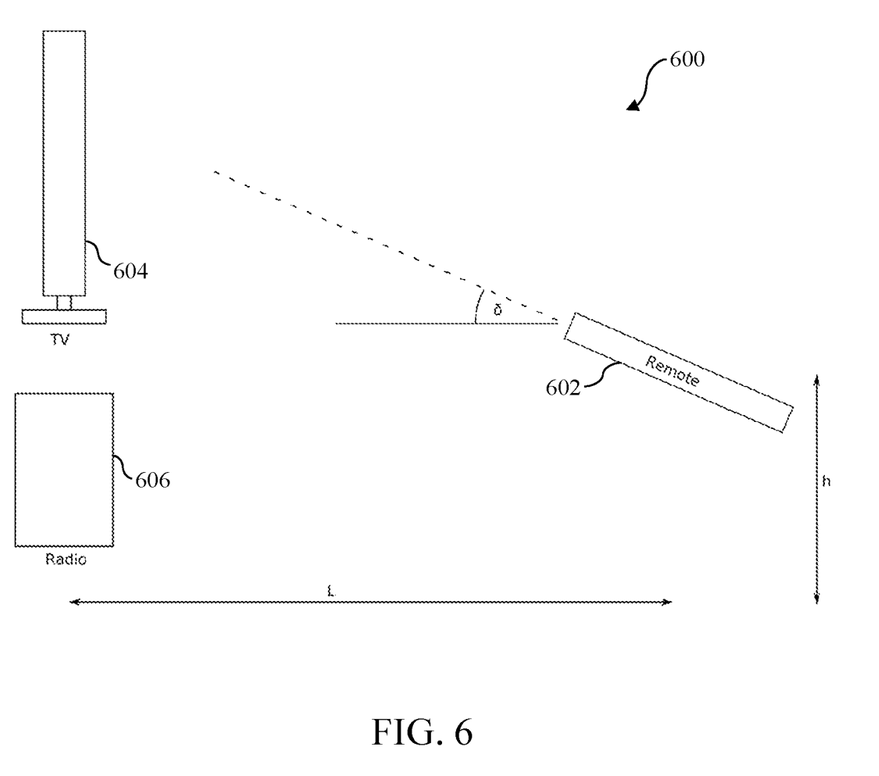
FIG. 6 shows an example of a control system.

FIG. 6 shows an example of a control system 600. The system 600 comprises a remote-control unit 602, a first electronic device 604 and a second electronic device 606. In this example, the first electronic device 604 (television) is placed above the second electronic device 606 (radio). The remote-control unit 602 points at the first electronic device 604 (television). The orientation of the remote-control unit 602 is measured by an inertial measurement unit (not shown) integrated into the remote-control unit 602. In this example, the angle of arrival measured by the UWB interface of the remote-control unit 602 is substantially the same for the first electronic device 604 and the second electronic device 606, because they have the same x- and y-coordinates. Thus, in this example, using only the IMU measurement data and the angle of arrivals the position of the remote-control unit 602 cannot accurately be determined. As a result, the selection of the targeted device may not be correct. Therefore, in one or more embodiments, the electronic devices 604, 606 comprise a plurality of ultra-wideband antennas. Thereby, a correct selection of a targeted device is also facilitated if the position of the electronic devices only differs in the z-direction. In a practical and effective implementation, the number of ultra-wideband antennas is three. Furthermore, in one or more embodiments, the electronic devices 604, 606 comprise a localization unit (not shown), which is configured to determine a relative position of the electronic devices with regard to the ultra-wideband communication unit using the ultra-wideband antennas. In this way, the position of the remote-control unit 602 relative to the first electronic device 604 and the second electronic device 606 can easily be determined.

Figure 7:
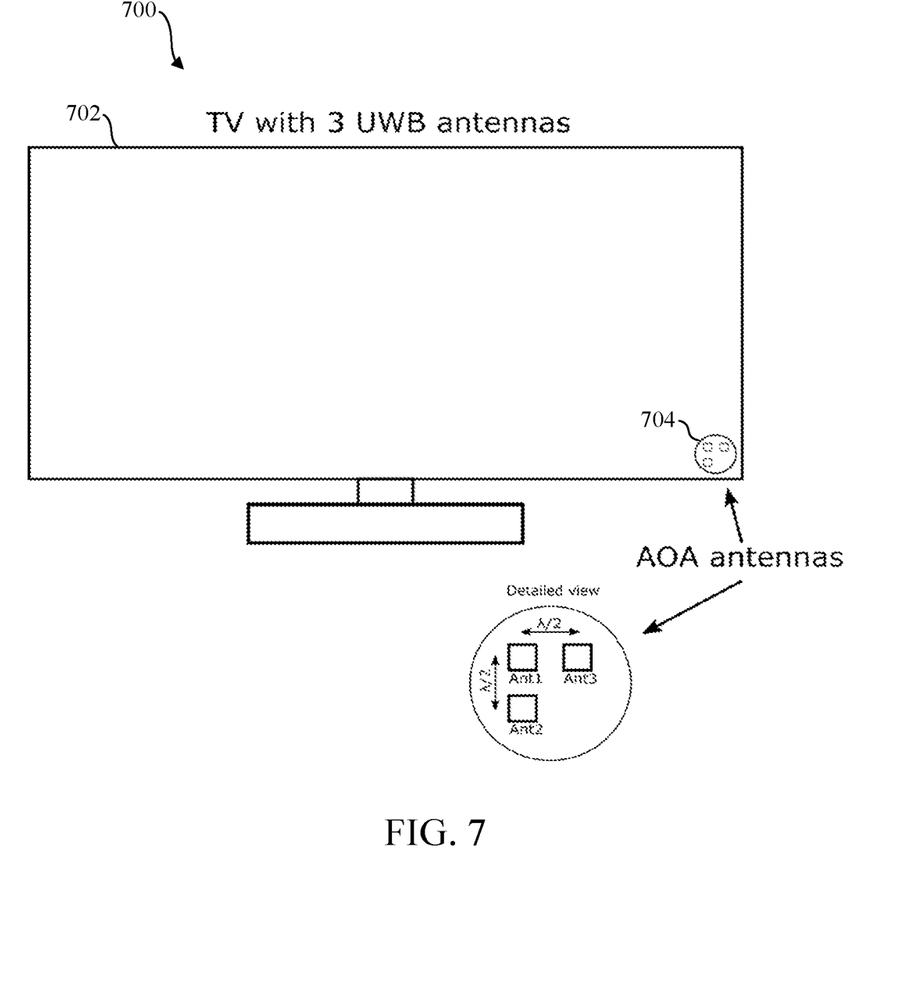
FIG. 7 shows an illustrative embodiment of an electronic device.

FIG. 7 shows an illustrative embodiment of an electronic device 700. The electronic devices comprises a plurality of UWB antennas 704. In particular, the electronic device 702 (television) contains three UWB antennas, which have known positions. Because of the known positions of the antennas two incoming angles can be measured, for example the vertical and the horizontal angle. Thus, by combining the angle of arrival measurements around these two axes with a UWB distance measurement, the relative position of the remote-control unit with regard to the electronic device 702 can be determined. It is noted that the positions of the antennas 704 are only examples. In principle, all antenna positions that enable the system to calculate the signal angles around two axes can be chosen. Furthermore, it is noted that the distances between the antennas may have an impact on the measurement accuracy and also on the measurement ambiguity. The example shown in FIG. 7 is a relatively simple arrangement, comprising a vertical and a horizontal antenna pair with a distance of λ/2 between the antennas, wherein λ represents the wavelength of the antennas.

Figure 8:
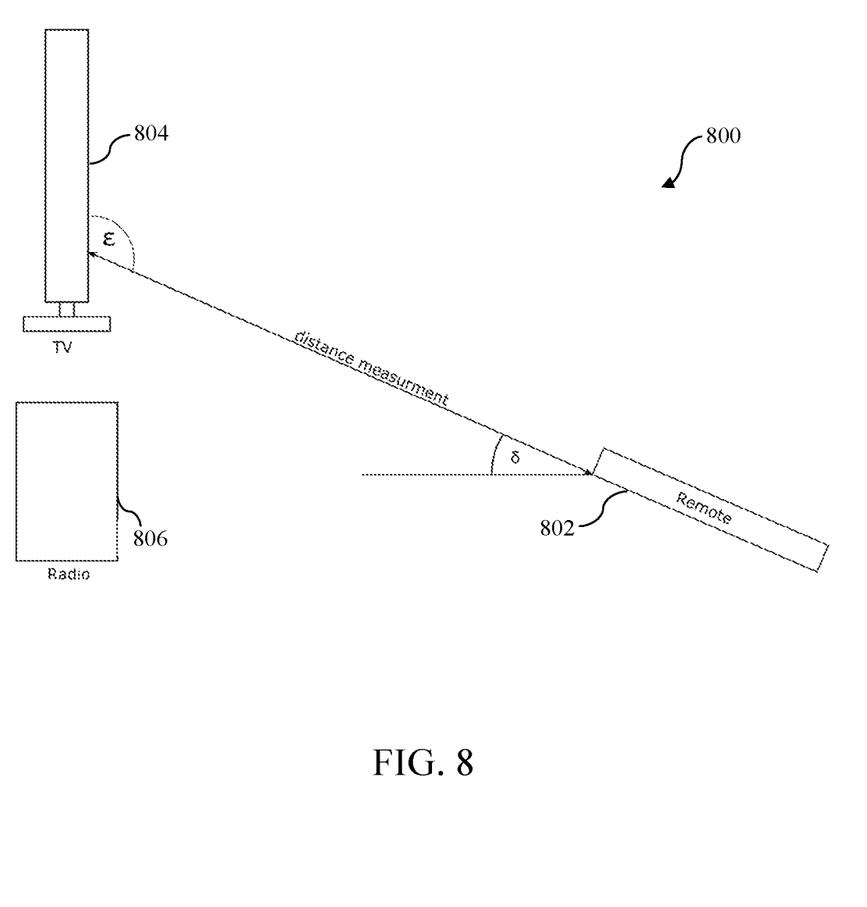
FIG. 8 shows a further illustrative embodiment of a control system.

FIG. 8 shows a further illustrative embodiment of a control system 800. In one or more embodiments, the processing unit is further configured to determine a first vertical angle, which is a vertical angle of arrival of a UWB signal transmitted by the UWB communication unit to the electronic devices, and the electronic devices are configured to determine a second vertical angle, which is a vertical angle of arrival of the same UWB signal as it is received by the electronic devices. This further facilitates the correct selection of a targeted device. In a practical and effective implementation, the processing unit is further configured to select the specific electronic device if the first vertical angle has a predefined correlation with the second vertical angle. In a further practical implementation, the predefined correlation is represented by the equation δ+90°=ε, wherein δ represents the first vertical angle and ε represents the second vertical angle.

The control system 800 shown in FIG. 8 comprises a remote-control unit 802 which is configured to control a first electronic device 804 (television) and a second electronic device 806 (radio). In particular, FIG. 8 shows that the television 804 measures the vertical angle of the incoming signal that was emitted by the remote-control unit 802. By combining the orientation data of the IMU of the remote-control unit 802 with the measured angle of arrival and time of flight at the side of the television 804, the direction in which the remote-control unit 802 points can be determined. In the shown example the angle ε is measured by the television 804; this angle determines the vertical angle of the incoming signal. The angle δ is measured by the remote-control unit 802 and determines the vertical orientation of the remote-control unit 802 relative to the magnetic and gravitational field. The angles δ and ε can be combined to determine whether or not the remote-control unit 802 points at the television 804. For example, if the measured angle ε is about 120°, the angle δ should be about 30° if the remote-control unit 802 points at the television 802. In other words, this embodiment corresponds to the above-mentioned practical implementation, in which the angles ε and δ should correlate in the following manner if the remote-control unit 802 points at the television 802: δ+90°=ε. It is noted that a certain measurement tolerance should be considered. However, if said angles ε and δ are within predefined tolerance borders, the probability that the remote-control unit 802 points at the television 804 is high. The horizontal angles can be compared in an analogous way. The horizontal and vertical angle measurements can be performed simultaneously using three receiver units. Alternatively, two subsequent measurements may be performed using, for example, two receiver units and an antenna switch.

It is noted that the remote-control unit 802 does not need to perform an angle of arrival measurement if the television 804 contains three antennas. If the remote-control unit 802 has a horizontally orientated antenna pair only the vertical pair of the antenna is needed on the television's side in order to determine the pointing direction. However, by using a vertical antenna pair in the television 804 and a horizontal antenna pair in the remote-control unit 802 the redundancy will be lost. As a result, the measurement accuracy may decrease if the remote-control unit's antenna axis is moved in such a way that the television's and remote-control unit's antenna axes are no longer orthogonal. Only one device with three antennas may be needed, because this device can measure the position of all the other devices in the room. This position can be used for calculating the incoming angles from the remote-control unit 802 to all the other devices. The decision on which device should react on the remote signal should be made by the remote-control unit 802 if the controlled devices, for example the television 804 and the radio 806, do not communicate with each other. If each device takes a decision autonomously, unwanted behavior may be the result, because each device may take different and inconsistent actions. If all the devices communicate with each other, the decision can be made by a central controlling device which could be either one of the controlled devices 804, 806 or the remote-control unit 802 itself. The transmission of the data can be carried out either by the UWB interface or another, out-of-band communication channel, which may be supported by the devices. Using an out-of-band communication channel may result in less communication on the UWB channel, which will result in a higher channel capacity on the UWB side. Using this system, a three-dimensional line-of-sight signal can be estimated by using a three-antenna system, which tracks the position of an emitter by combining angle-of-arrival and time-of-flight measurements, and the direction of the signal can be estimated by combining the determined position with the orientation data of the remote-control unit 802. Furthermore, an advantage of an UWB-based system is that the remote-control unit 802 does not need a direct line of sight with the controlled devices 804, 806, because the RF signal can be still received through interposed objects.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 orientation sensing
102 remote control unit
200 control system
202 first position of remote-control unit 204 second position of remote-control unit
206 first electronic device
208 second electronic device
300 control system
302 UWB communication unit
304 processing unit
400 control method for controlling electronic devices
402 receiving, by a UWB communication unit, ultra-wideband signals from electronic devices
404 selecting, by a processing unit, a specific electronic device among said electronic devices for further communication, wherein the processing unit selects said specific electronic device using an angle of arrival of the ultra-wideband signals received from the electronic devices
500 control system
502 remote control unit
504 first electronic device
506 second electronic device
600 control system
602 remote control unit
604 first electronic device
606 second electronic device
700 electronic device
702 television
704 UWB antennas
800 control system
802 remote control unit
804 first electronic device
806 second electronic device

The invention claimed is:

1. A control system for controlling electronic devices, the control system comprising:
an ultra-wideband communication unit configured to receive ultra-wideband signals from the electronic devices; and
a processing unit configured to select a specific electronic device among said electronic devices for further communication;
an inertial measurement unit configured to measure a direction of a magnetic field, wherein the processing unit is further configured to measure an orientation of a control unit with the magnetic field;
wherein the processing unit is configured to select said specific electronic device using an angle of arrival of the ultra-wideband signals received from the electronic devices, the angle of arrival relative to the orientation of the control unit, wherein each of the electronic devices comprise at least three ultra-wideband antennas, wherein a relative position is determined with regard to the ultra-wideband communication unit using the at least three ultra-wideband antennas, wherein the processing unit is configured to select, as the specific electronic device, the electronic device from which the ultra-wideband signal having the smallest angle of arrival is received, and wherein the further communication comprises transmitting one or more functional commands to the selected specific electronic device.

2. The control system of claim 1, being integrated into a remote control unit.

3. The control system of claim 1, further comprising the electronic devices.

4. The control system of claim 1, wherein the number of ultra-wideband antennas is three.

5. The control system of claim 1, wherein the electronic devices comprise a localization unit, wherein said localization unit is configured to determine a relative position of the electronic devices with regard to the ultra-wideband communication unit using the ultra-wideband antennas.

6. The control system of claim 3, wherein the processing unit is further configured to determine a first vertical angle, being a vertical angle of arrival of an ultra-wideband signal transmitted by the ultra-wideband communication unit to the electronic devices, and wherein the electronic devices are configured to determine a second vertical angle, being a vertical angle of arrival of said ultra-wideband signal as received by the electronic devices.

7. The control system of claim 6, wherein the processing unit is further configured to select the specific electronic device if the first vertical angle has a predefined correlation with the second vertical angle.

8. The control system of claim 7, wherein the predefined correlation is represented by the equation $\delta+90°=\epsilon$, wherein $\delta$ represents the first vertical angle and $\epsilon$ represents the second vertical angle.

9. A control method for controlling electronic devices, the control method comprising:
receiving, by an ultra-wideband communication unit, ultra-wideband signals from the electronic devices; and
selecting, by a processing unit, a specific electronic device among said electronic devices for further communication;
measuring, using an inertial measurement unit, a direction of a magnetic field, wherein the processing unit is further configured to measure an orientation of a control unit with the magnetic field;
wherein the processing unit selects said specific electronic device using an angle of arrival of the ultra-wideband signals received from the electronic devices, the angle of arrival relative to the orientation of the control unit, wherein each of the electronic devices comprise at least three ultra-wideband antennas, wherein a relative position is determined with regard to the ultra-wideband communication unit using the at least three ultra-wideband antennas, wherein the processing unit is configured to select, as the specific electronic device, the electronic device from which the ultra-wideband signal having the smallest angle of arrival is received, and wherein the further communication comprises transmitting one or more functional commands to the selected specific electronic device.

10. The control method of claim 9, wherein the control system is integrated into a remote control unit.

11. The control method of claim 9, wherein the control system further comprises the electronic devices.

* * * * *